Patented Nov. 11, 1947

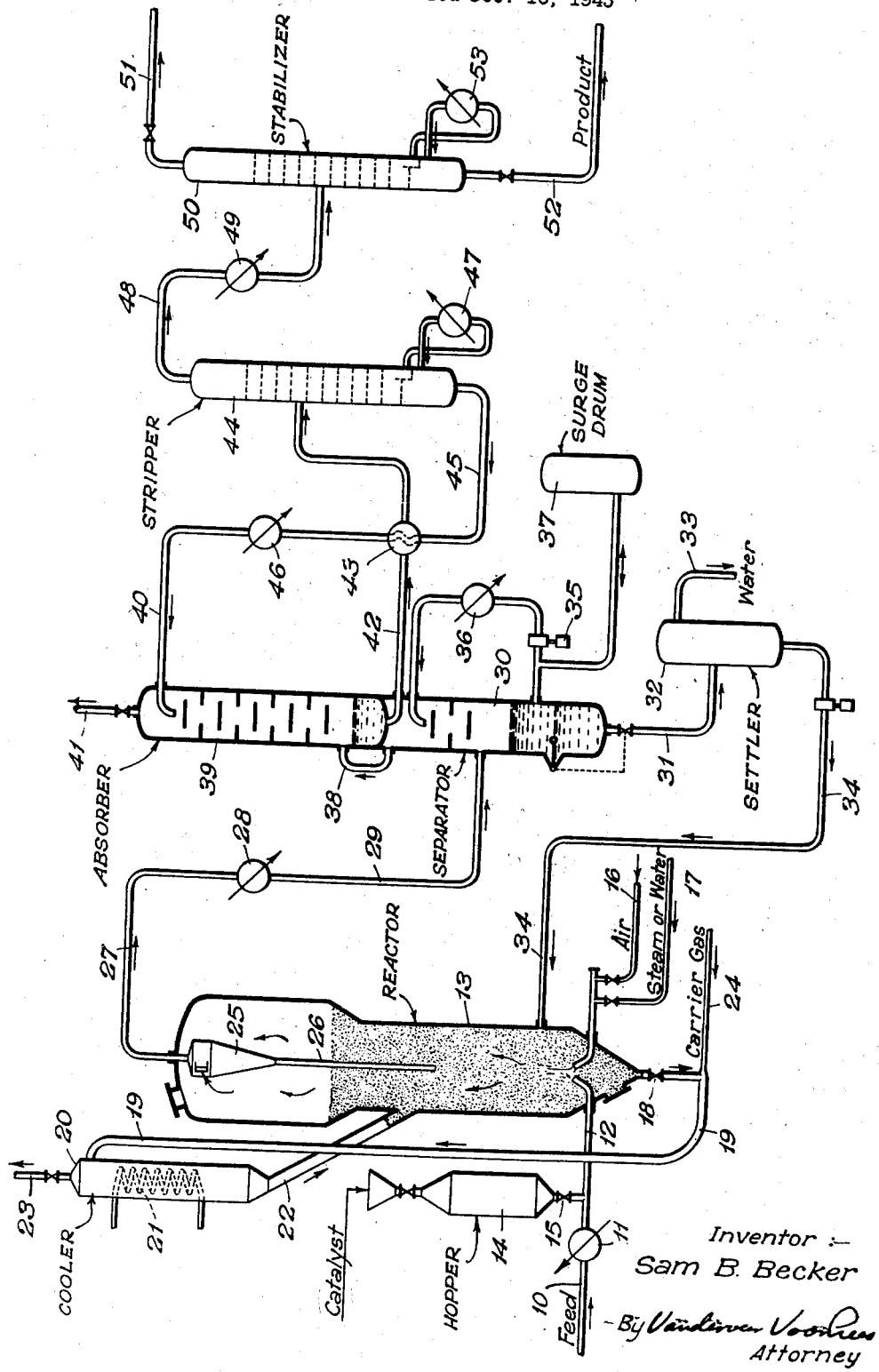

2,430,443

UNITED STATES PATENT OFFICE 2,430,443

OLEFIN OXIDES

Sam B. Becker, Chicago, Ill., assignor to Standard Oil Company, Chicago, Ill., a corporation of Indiana Application December 16, 1943, Serial No. 514,570

6 Claims. (Cl. 260—348.5)

This invention relates to the process of making olefin oxides by direct oxidation of olefins in the presence of a catalyst and the invention relates particularly to the manufacture of ethylene oxide. It has been known heretofore to produce ethylene oxide by direct oxidation of ethylene with air or oxygen in the presence of a contact catalyst, the catalyst being generally situated in a bed of granular porous material. One of the difficulties with this method of making ethylene oxide has resulted from the serious problem of temperature control in the catalyst mass, owing largely to the low heat conductivity of the catalyst and the virtual impossibility of providing any effective means for controlling temperature thruout the reaction zone. The reaction between olefins and oxygen with the formation of olefin oxides is theoretically slightly endothermic and therefore should require the addition of a small amount of heat. However, side reactions leading to the formation of the carbon oxides, CO and $CO_2$, are highly exothermic and once these reactions start the temperature rapidly passes out of control and the yield of olefin oxide suffers severely, since very close temperature control is essential for the desired reaction.

One of the objects of my invention therefore is to provide a more positive and efficient method of temperature control in the oxidation of olefins to olefin oxides and thereby prevent undesired, highly exothermic side reactions. Another object of my invention is to provide a method of direct oxidation of ethylene to ethylene oxide without requiring the large amounts of steam or water heretofore found necessary in carrying out this reaction. Another object of my invention is to effect the conversion of ethylene to ethylene oxide in a continuous manner without interruption of the process for replacement or regeneration of catalyst. Still another object of the invention is to produce ethylene oxide in higher concentration, thereby facilitating its recovery from the reaction products.

This application is a continuation-in-part of U. S. Patent 2,376,987, March 29, 1945.

The invention is illustrated by a drawing which shows, in diagram, an apparatus for carrying out the process.

Referring to the drawing, the olefin feed stock, for example ethylene, propylene or butylene, or mixtures thereof such as cracking still gas, is introduced by line 10 and preheated, if desired, in heater 11; thence it flows by line 12 into reactor 13. Catalyst is introduced from hopper 14 by valved outlet 15 as desired. The catalyst is a subdivided solid, powdered or granulated material which may be silver or copper or it may be prepared by impregnating the catalytic substance on a suitable refractory carrier. For example copper or silver oxide may be deposited on silica gel, kieselguhr, magnesium oxide, alumina, bauxite, alundum, alumina gel, quartz, porcelain, titania, zirconia, zircon, etc., and, if desired, small amounts of promoter elements such as gold, cobalt, or manganese may be employed in addition. Generally about 1 to 15% of silver or copper is satisfactory. Antimony, bismuth and nickel have also been found effective, alone or in mixtures with one or more of the above substances. It is preferred to have the catalyst in the form of granules of rather uniform size, preferably of the order of 10 to 100 mesh, although finer materials may be used.

In reactor 13 the catalyst accumulates until the desired amount of catalyst is obtained and thereafter no further catalyst need be added except to make up for losses. The catalyst in reactor 13 is maintained in constant turbulent suspension as a dense, fluidized solid by the upflowing stream of vapors introduced therein. The turbulent movement of the granular or powdered solid catalyst serves to maintain a uniform temperature throughout the reactor 13 and particularly throughout the lower part of the reactor where the density of the catalyst is greatest. The density is ordinarily within the range of about 5 to 25 pounds per cubic foot, although higher densities may be employed depending on the nature of the catalyst, the particle size and the velocity of the upflowing vapors. Thus densities of 50 to 75 pounds per cubic foot may sometimes be employed.

Oxidation of the olefin in reactor 13 is brought about by the introduction of an oxygen-containing gas, for example air, by line 16. Simultaneously, steam or water may be introduced by line 17 in carefully regulated amounts as it has been found that the presence of water in the reactor exerts a beneficial effect upon the catalyst and increases the yield of the desired olefin oxide product. The amount of water required for this purpose may be about 0.1 to 10 mols per mol of olefin treated. When cooling of the reaction zone 13 is required, it is preferred to introduce liquid water, and contrarywise, steam may be introduced when no cooling is required. In my process, the presence of water is less important than in prior olefine oxidation processes where the reaction could not be controlled otherwise.

The amount of oxygen supplied to the reaction zone is carefully controlled, usually within the range of about 0.2 to 3 mols per mol of olefin treated. An oxygen/olefine mol ratio of about 0.5 to 1.0 is generally satisfactory.

The temperature of the reaction zone 13 is carefully controlled within the range of about 100 to 450° C., depending on the particular olefin feed stock employed and on other factors. As indicated above, the desired reaction is theoretically slightly endothermic but practically the reaction is usually exothermic and some heat must be dissipated. This may be accomplished in various ways, for example, by placing cooling coils in reactor 13 in contact with the catalyst therein, by introducing water or steam as hereinabove mentioned, by decreasing or increasing the temperature of the olefin feed stock supplied thru line 12, for example by by-passing heater 11, etc. Another method of controlling reaction temperature which is quite flexible is to recycle catalyst thru an external cooler and back to the reactor. The drawing shows such an arrangement whereby catalyst is withdrawn thru valve 18 and thence conducted with a carrier gas by line 19 to cooler 20 wherein the catalyst flows downward over cooling coil 21 and thence back by gravity to the reactor thru line 22. The coil 21 may be supplied with a stream of water, low-melting salt or salt solution, low-melting alloy, mercury, diphenyl and/or diphenyl oxide, or other suitable cooling fluid. Any uncondensed gases are eliminated before the cooler by line 23. Transportation of catalyst from the base of reactor 13 to cooler 20 is facilitated by introducing a carrier gas by line 24. For this purpose methane, nitrogen, air, flue gas, or other suitable gas may be employed, care being taken to avoid the use of explosive mixtures.

In the upper part of reactor 13 the catalyst density is quite low and the catalyst in this region may be considered to be in dilute phase. In order to prevent as far as conveniently possible loss of catalyst from the reactor, the product vapors are conducted thru cyclone separator 25 and separated catalyst is returned by dip leg 26 to the lower section of the reactor. The vapors consisting largely of olefin oxide and unchanged olefins are conducted by line 27 thru cooler 28 and thence by line 29 to separator 30 where condensed water is allowed to collect along with catalyst carried over with the products. The separated water and catalyst are withdrawn by line 31 leading to separator 32 from which water is discarded by line 33 and the settled catalyst is returned to the reactor by line 34. For this purpose it may be returned as a pumpable water slurry.

Oil and water-insoluble organic liquids collecting as an upper layer in the base of separator 30 may be recycled by pump 35 thru cooler 36 back into separator 30 to provide a washing and contacting action for the vapors. As the quantity of this oil tends to increase or decrease in volume, additional amounts may be drawn from or returned to surge drum 37.

Separator vapors from 30 are conducted by line 38 to the base of absorber 39 wherein olefin oxide products are absorbed by means of a suitable absorbent such as an alcohol, ketone, grain alcohol, glycerine, etc., introduced by line 40. Unabsorbed vapors are discarded by line 41. Absorbed olefin oxide is conducted by line 42 to heat exchanger 43 into stripper 44 and recovered absorber liquid, e. g., alcohol, glycol, etc., is withdrawn at the bottom by line 45, cooled by cooler 46 and returned to the absorber by line 40. Heat may be supplied to stripper 44 by means of trapout heater 47. The product vapors leaving stripper 44 are conducted by line 48 thru cooler 49 into stabilizer 50 wherein undesired gases are discarded by line 51 while olefin oxide product is withdrawn at the base by line 52. Heat for the operation of the stabilizer is supplied by trapout heater 53.

I have described specific methods for conducting the olefin oxide process but it is intended that the invention be not restricted thereby. Thus various alternative methods may be used for recovering the olefin oxide product from the reaction gases without departing from the invention. For example, the olefin oxide may be recovered by an initial water scrubbing to absorb the majority of the olefin oxide and absorbent charcoal or other suitable absorbent may be employed for completing the recovery of olefin oxide.

The catalyst employed in fluidized form in reactor 13 may be prepared in various ways, for example, as a powder or in small pellets, granules, etc., it being essential only that the catalyst be maintained in turbulent suspension during the operation of the process. The catalyst may also be admixed with inert granular material which serves the purpose of dissipating heat from the reaction zone. Silica, magnesia, or alumina are suitable for this purpose.

The process may be applied to the oxidation of olefin gas mixtures containing substantial amounts of paraffin hydrocarbons such as ethane, methane, propane and butane. However, gases high in olefins are preferred and gases from catalytic cracking are particularly well suited to my process.

I claim:

1. The process of producing olefin oxides which comprises passing a stream of olefin gas upwardly thru a reaction zone containing a fluidized, turbulent, dense suspension of a granular catalyst capable of promoting the addition of oxygen to an olefin, said suspension having a density of at least 5 pounds per cubic foot, separately introducing a stream of oxygen-containing gas into said reaction zone thereby preventing contact and reaction between said oxygen-containing gas and said olefin gas before said gases contact said catalyst, effecting reaction between said oxygen and said olefin substantially entirely in the presence of said catalyst, controlling the temperature of said catalyst within the range of about 100 to 400° C., maintaining the ratio of oxygen to olefin in the range of about 0.2 to 3 mols of oxygen per mol of olefin, maintaining sufficient turbulence within said catalyst suspension by the action of the upflowing gases to prevent any substantial local overheating in said reaction zone, withdrawing the reaction products from the upper part of said reaction zone and recovering olefin oxides from said reaction products.

2. The process of claim 1 wherein said catalyst is essentially silver.

3. The process of claim 1 wherein heat generated by said reaction within said reaction zone is dissipated by cycling a portion of said turbulent catalyst suspension thru a cooling zone and back to said reaction zone.

4. The process of claim 1 wherein water is supplied to said reaction zone in the amount of 0.1 to 10 mols per mol of olefin treated.

5. The process of claim 1 wherein the density of the fluid, turbulent, dense catalyst suspension is in the range of about 5 to 75 pounds per cubic foot.

6. The process of producing olefin oxides which comprises injecting into a reaction zone containing a dense, fluidized suspension of powdered catalyst capable of promoting the addition of oxygen to an olefin, said suspension having a density of at least 5 pounds per cubic foot, a highly unsaturated olefin-containing hydrocarbon refinery gas stream, forcing said stream to flow upwardly thru said reaction, thereby maintaining the catalyst in turbulent fluid suspension, separately introducing a stream of air into said reaction zone thereby preventing contact and reaction between said air and said olefin-containing gas before said gases contact said catalyst, simultaneously adding water to said reaction zone, effecting intimate contact in the reaction zone between said refinery gas, air, and water in the presence of said catalyst, maintaining the temperature of said catalyst within the range of about 100 to 450° C., maintaining the ratio of oxygen to olefin within the range of about 0.2 to 3 mols of oxygen per mol of olefin, avoiding local overheating of said catalyst by the rapid turbulent motion thereof, withdrawing reaction products from the upper part of said reaction zone and recovering olefin oxides from the reaction products.

SAM B. BECKER.

REFERENCES CITED

The following references are of record in the file of this patent:

UNITED STATES PATENTS

| Number | Name | Date |
|---|---|---|
| 2,373,008 | Becker | Apr. 3, 1945 |
| 2,178,454 | Metzger | Oct. 31, 1939 |
| 2,040,782 | Van Peski | May 12, 1936 |
| 2,194,602 | Law | Mar. 26, 1940 |
| 1,995,991 | Lehner | Mar. 26, 1935 |
| 1,984,380 | Odell | Dec. 18, 1934 |
| 2,309,034 | Barr | Jan. 19, 1943 |